M. S. NILSSON.
BED PAN.
APPLICATION FILED MAR. 10, 1911.
1,002,077.
Patented Aug. 29, 1911.
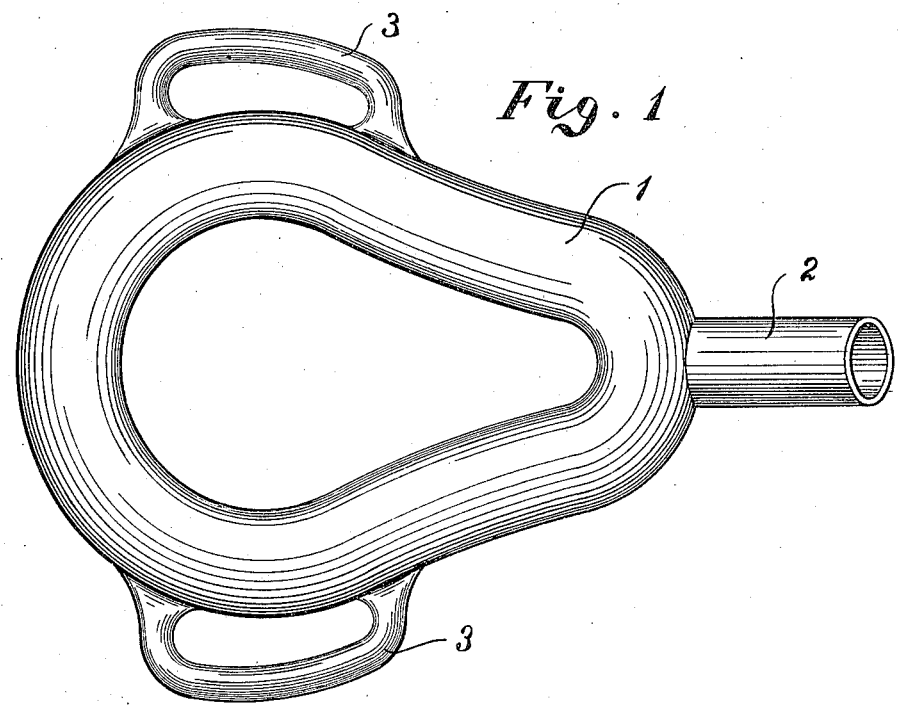

UNITED STATES PATENT OFFICE.

MARIA SOFIA NILSSON, OF KARLSKRONA, SWEDEN.

BED-PAN.

1,002,077.  Specification of Letters Patent.  Patented Aug. 29, 1911.

Application filed March 10, 1911. Serial No. 613,535.

*To all whom it may concern:*

Be it known that I, MARIA SOFIA NILSSON, a subject of the King of Sweden, residing at Karlskrona, in the Kingdom of Sweden, have invented new and useful Improvements in Bed-Pans, of which the following is a specification, reference being had to the drawing accompanying and forming a part hereof.

This invention relates to cordiform bed pans or bed pans of the kind having an oblong shape tapering toward one end.

The object of the invention is to enable the patient to keep hold of the pan while changing position, in order to procure the ease afforded even by a slight change of position of the body, and the invention consists chiefly in this that the pan is provided at the sides with suitable handles.

In the drawing, I have shown a bed pan embodying the invention.

Figure 1 is a plan view and Fig. 2 is a side view of the said bed pan.

Referring to the drawing, the bowl or vessel 1 forming the main part of the bed pan has an oblong shape tapering toward one end, while the opposite end is substantially semi-circular in shape. The sides are slightly introflexed. Placed at the narrower end of the pan is a discharge pipe 2 bent upward (Fig. 2) as usual so as to prevent the material from running out. Placed at the sides, preferably at the broadest part of the pan, are handles 3 enabling the patient to keep hold of the pan while changing position. These handles also afford ease to the nurse in handling the pan.

I claim:

A bed pan comprising an oblong vessel tapering at one end, a discharge pipe placed at the narrower end of the said vessel, and handles placed at the sides thereof, substantially as and for the purpose set forth.

MARIA SOFIA NILSSON.

Witnesses:
 AUG. SÖRENSEN,
 KARL RUNESKOG.

Copies of this patent may be obtained for five cents each, by addressing the "Commissioner of Patents, Washington, D. C."